United States Patent
Patenaude et al.

(10) Patent No.: US 7,151,790 B1
(45) Date of Patent: Dec. 19, 2006

(54) AUTOMATIC SIGNAL EXTRACTION AND ANALYSIS FROM TIME-FREQUENCY REPRESENTATION

(75) Inventors: Francois Patenaude, Gatineau (CA); Martial Dufour, Aylmer (CA)

(73) Assignee: Her Majesty the Queen in right of Canada, as represented by the Minister of Industry, Ottawa (CA)

( * ) Notice: Subject to any disclaimer, the term of this patent is extended or adjusted under 35 U.S.C. 154(b) by 818 days.

(21) Appl. No.: 10/255,721

(22) Filed: Sep. 27, 2002

Related U.S. Application Data

(60) Provisional application No. 60/325,185, filed on Sep. 28, 2001.

(51) Int. Cl.
*H04B 1/713* (2006.01)

(52) U.S. Cl. ............... 375/132; 375/229; 375/343; 370/330

(58) Field of Classification Search ........... 375/130, 375/132, 136, 140, 142, 145, 147, 149, 150, 375/340, 343, 362, 368, 229, 316, 354, 363; 370/310, 328, 329, 330
See application file for complete search history.

(56) References Cited

U.S. PATENT DOCUMENTS

| | | | | |
|---|---|---|---|---|
| 4,177,447 A | * | 12/1979 | Jaouen | 714/812 |
| 5,379,047 A | * | 1/1995 | Yokev et al. | 342/457 |
| 5,841,807 A | * | 11/1998 | Hannebauer et al. | 375/142 |
| 6,147,646 A | * | 11/2000 | Arneson et al. | 342/417 |
| 6,298,081 B1 | * | 10/2001 | Almgren et al. | 375/132 |
| 6,363,099 B1 | * | 3/2002 | Sakoda et al. | 375/131 |
| 6,580,358 B1 | * | 6/2003 | Nysen | 340/10.41 |
| 7,010,015 B1 | * | 3/2006 | Hervey et al. | 375/132 |
| 2002/0191678 A1 | * | 12/2002 | Batra et al. | 375/132 |
| 2005/0227626 A1 | * | 10/2005 | Stoddard et al. | 455/67.11 |
| 2006/0018365 A1 | * | 1/2006 | Jung et al. | 375/132 |

FOREIGN PATENT DOCUMENTS

| | | | |
|---|---|---|---|
| GB | 2 261 141 A | * | 11/1992 |
| GB | 2261141 | * | 11/1992 |

OTHER PUBLICATIONS

Aydin et al., "Hop-Timing Estimation for FH Signals Using a Coarsely Channelized Receiver", IEEE Transactions on Communications, vol. 44, no. 4, pp. 516-526, Apr. 1996.

(Continued)

*Primary Examiner*—Pankaj Kumar
*Assistant Examiner*—Naheed Ejaz
(74) *Attorney, Agent, or Firm*—Freedman & Associates

(57) ABSTRACT

The problem of operationally analyzing spread spectrum frequency-hopping transmissions has been known since the invention of frequency-hopping radios. A frequency-hopping radio transmits a communication using small signal segments of data making up the transmission in accordance to a set of predetermined parameters. In this type of transmission each small segment of data is transmitted at a different frequency, one after another, until the transmission is completed. In some cases, it may be desirable to analyze these radio transmissions and to be able to determine radio spectrum usage and provide a mean to report on interference in frequency bands where multiple types of transmissions are possible. A novel method of isolating multiple transmission signals that are transmitted using frequency-hopping and apparatus is thus proposed which receives at least a transmission and performs operations within frequency bands of the received transmission in order to monitor and characterize signal energy therein.

23 Claims, 8 Drawing Sheets

OTHER PUBLICATIONS

Barbarossa et al., "Parameter Estimation of Spread Spectrum Frequency-Hopping Signals Using Time-Frequency Distributions", IEEE Signal Processing Workshop on Signal Processing Advances in Wireless Communications, Paris, France, pp. 213-216, 1997.

Beaulieu et al., "Interception of Frequency-Hopped Spread-Spectrum Signals", IEEE Journal on Selected Areas in Communications, vol. 8, no. 5, pp. 853-870, Jun. 1990.

Bezdek et al., "Fuzzy Models for Pattern Recognition", Methods that Search for Structures in Data, IEEE Press, New York, 1992.

Crochiere et al., "Multirate Digital Signal Processing", Prentice-Hall, Signal Processing Series, pp. 313-326, New Jersey, 1983.

Gumas, "Window-Presum FFT Achieves High-Dynamic Range, Resolution", Personal Engineering & Instrumentation News, pp. 58-65, Jul. 1997.

Simon et al., "Spread Spectrum Communications", Communications Science Press, vol. III, chap. 3, pp. 208-279, Rockville, MD, 1985.

* cited by examiner

| Signal ID | Fc (MHz) | BW (kHz) | Power (dBm) | SNR (dB) | Modulation | Start Time (h:m:s.mµ) | Duration (ms) | Net ID |
|---|---|---|---|---|---|---|---|---|
| 1 | 907.9334 | 19.219 | -99.7 | 13.8 | FSK | 15:28:01.000000 | 0.000 | 0 |
| 2 | 911.6826 | 15.469 | -101.4 | 17.8 | FSK | 15:28:01.001500 | 7.400 | 1 |
| 3 | 909.6337 | 15.781 | -106.1 | 14.2 | FSK | 15:28:01.008100 | 7.400 | 2 |
| 4 | 909.1816 | 14.844 | -95.3 | 22.6 | FSK | 15:28:01.010100 | 7.400 | 1 |
| 5 | 912.1823 | 14.531 | -104.2 | 15.1 | FSK | 15:28:01.010500 | 7.400 | 3 |
| 6 | 909.7330 | 19.063 | -98.0 | 20.5 | FSK | 15:28:01.009700 | 9.000 | 4 |
| 7 | 908.5835 | 12.813 | -109.4 | 11.8 | FM | 15:28:01.017700 | 6.800 | 0 |
| 8 | 909.4317 | 18.281 | -105.2 | 13.3 | FSK | 15:28:01.019500 | 7.200 | 3 |
| 9 | 909.0566 | 15.469 | -96.3 | 21.6 | FSK | 15:28:01.028100 | 7.400 | 1 |
| 10 | 911.9318 | 14.531 | -103.4 | 15.9 | FSK | 15:28:01.028500 | 7.400 | 3 |
| 11 | 910.8581 | 15.781 | -94.6 | 23.2 | FSK | 15:28:01.037100 | 7.400 | 1 |
| 12 | 910.4829 | 15.781 | -95.9 | 25.1 | FSK | 15:28:01.039500 | 9.200 | 4 |
| 13 | 909.7789 | 7.656 | -102.9 | 17.3 | Other | 15:28:01.046500 | 7.400 | 3 |
| 14 | 910.5577 | 19.219 | -96.9 | 21.0 | FSK | 15:28:01.049700 | 8.800 | 4 |
| 15 | 908.9324 | 20.000 | -107.8 | 11.5 | FM | 15:28:01.053500 | 7.000 | 2 |
| 16 | 912.1831 | 11.406 | -103.8 | 15.4 | FSK | 15:28:01.055500 | 7.400 | 3 |
| 17 | 909.8082 | 17.656 | -97.3 | 20.5 | FSK | 15:28:01.059700 | 9.000 | 4 |
| 18 | 911.7629 | 15.156 | -95.1 | 23.4 | FSK | 15:28:01.064100 | 7.400 | 1 |
| 19 | 909.2311 | 13.438 | -104.0 | 15.2 | FSK | 15:28:01.064500 | 7.600 | 3 |
| 20 | 909.3826 | 16.406 | -105.5 | 13.8 | FSK | 15:28:01.071100 | 7.400 | 2 |
| 21 | 909.7069 | 17.188 | -97.7 | 20.8 | FSK | 15:28:01.069700 | 9.000 | 4 |
| 22 | 909.0069 | 15.625 | -107.6 | 11.7 | OTHER | 15:28:01.073500 | 7.400 | 3 |
| 23 | 911.0078 | 14.688 | -95.2 | 22.6 | FSK | 15:28:01.082100 | 7.400 | 1 |
| 24 | 910.3576 | 14.375 | -104.6 | 15.6 | FSK | 15:28:01.082500 | 7.400 | 3 |
| 25 | 908.1074 | 17.969 | -107.1 | 12.2 | FM | 15:28:01.089300 | 7.000 | 2 |
| 26 | 911.6077 | 13.750 | -97.9 | 19.9 | FSK | 15:28:01.089700 | 9.000 | 4 |
| 27 | 909.2833 | 15.313 | -104.8 | 14.5 | OTHER | 15:28:01.091500 | 7.400 | 3 |
| 28 | 909.6875 | 15.000 | -104.0 | 15.3 | | 15:28:01.098300 | 0.000 | 0 |
| 29 | 911.2850 | 30.000 | -93.1 | 23.1 | | 15:28:01.099700 | 0.000 | 0 |

Fig. 7

AUTOMATIC SIGNAL EXTRACTION AND ANALYSIS FROM TIME-FREQUENCY REPRESENTATION

This application claims priority from Provisional Application No. 60/325,185 filed Sep. 28, 2001.

FIELD OF THE INVENTION

The field of the invention relates generally to wireless communications and more specifically to a method of blind signal extraction from wireless signals transmitted using spread spectrum frequency hopping.

BACKGROUND OF THE INVENTION

The problem of operationally monitoring frequency-hopping transmissions has been known since the invention of frequency-hopping radios. A frequency-hopping radio transmits communication data in small signal segments of data, with each typically being at a different frequency to the one preceding and following it. The order and selection of frequencies used within a transmission is selected in accordance with a set of predetermined parameters. Given a same set of parameters as a transmitter, a frequency-hopping receiver, hops frequencies in a near identical fashion to the frequency-hopping transmitter and is thus able to ensure complete and proper reception of the communication data. Thus, by using a predetermined set of parameters for both transmitter and receiver, communication is possible between two radios. This is a very efficient way to reduce signal interference in radio bands where channel assignment is not regulated or where different signal types can be encountered, as in the Industrial, Scientific and Medical (ISM) radio frequency band.

Prior Art receiving radios, used for blind analysis of communication data transmitted using frequency hopping, absent the necessary predetermined set of parameters, hop their receiver frequencies in a different order than the transmitting radio and as such, even if they receive a segment of the transmission, are not capable of reconstructing the complete communication data. Thus, spread spectrum frequency hopping, is a challenge for spectrum monitoring as it prevents a clear representation of time-coherent signal activities, especially if more than one user is present at the same time instant.

Recently, a few approaches that make use of filter banks for estimating some of the critical predetermined set of parameters associated with frequency-hopping transmitters have been proposed. These techniques rely on filter banks and use a time-frequency plane to detect a single signal and then estimate several of its parameters. While they provide some basic concepts for signal extraction for obtaining a portion of transmitted communication data from a single source, they either assume knowledge of key predetermined parameters or assume the presence of only one transmitted signal. Unfortunately, this is unrealistic in an operational environment since typically none of the parameters are known and because many signals are typically transmitted simultaneously in a same local area.

A need therefore exists for a spectrum monitoring and surveillance system for realistic signal environment in spectrum bands in usage today. It is therefore an object of the invention to provide a spectrum monitoring system for monitoring portions of a communication from a frequency hopping radio transmitter that overcomes limitations in the prior art for wireless communication applications.

SUMMARY OF THE INVENTION

In accordance with the invention there is provided a method of isolating transmission signals that are transmitted using spread spectrum frequency-hopping comprising the steps of: receiving RF energy within a frequency band and providing a received signal in dependence thereon; digitizing the receive signal to form a digital signal; transforming the digital signal to provide transformed data within one of a time-frequency domain and a time-scale domain using a known transform; locating regions within the one of a time-frequency domain and a time-scale domain wherein the transformed data is indicative of energy other than noise being present; analyzing the transformed data within the located region to determine first signal parameters thereof; and, de-interleaving the frequency-hopping signals in dependence upon the located regions and the determined first signal parameters thereof.

BRIEF DESCRIPTION OF THE DRAWINGS

An embodiment of the invention will now be described with reference to the figures in which:

FIG. 3b illustrates steps performed in the signal detection block outlined in FIG. 3a;

DETAILED DESCRIPTION OF THE INVENTION

Signal Acquisition

Figure 1:
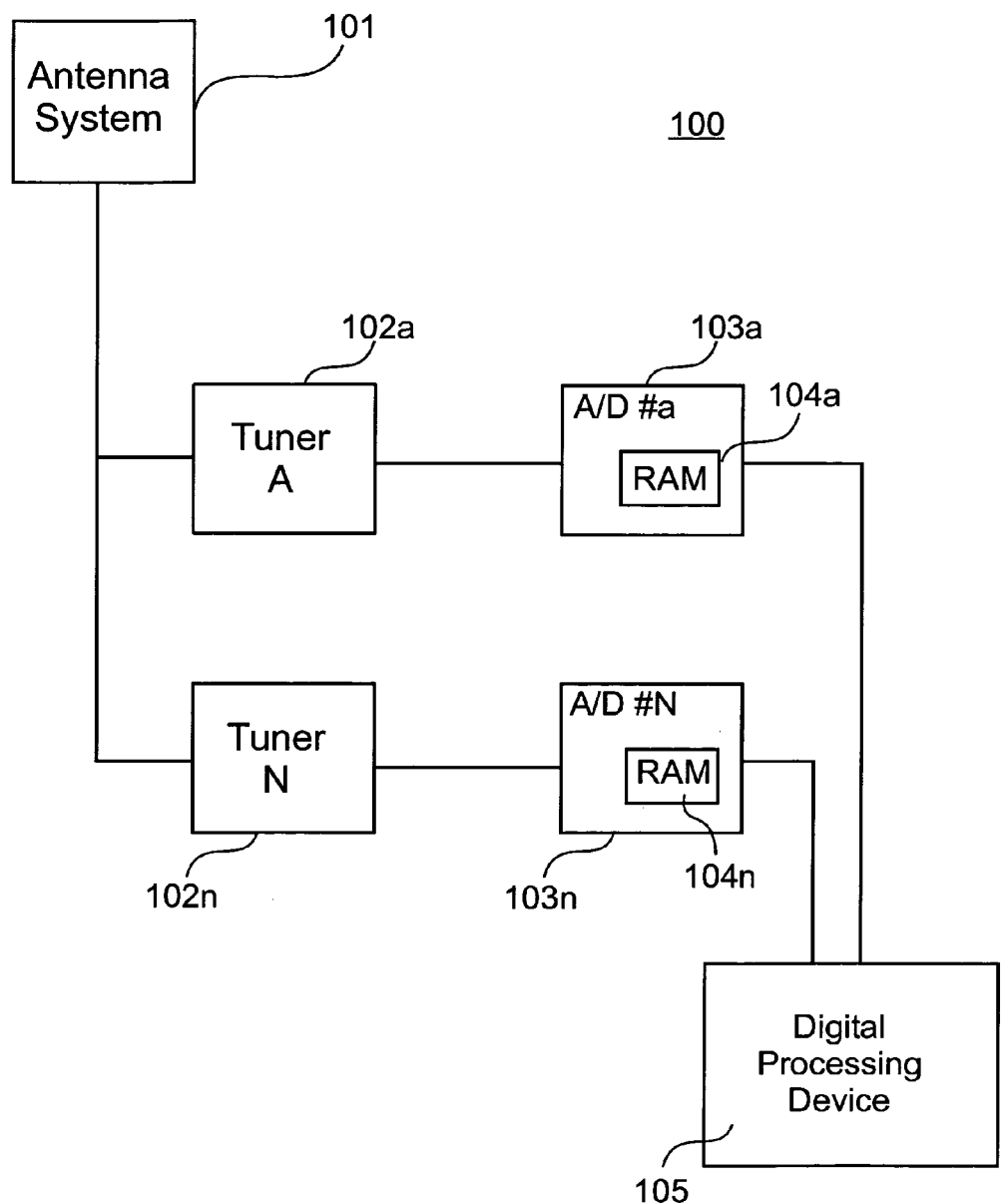
FIG. 1 illustrates a system used to receive, sample and buffer multiple frequency-hopped signals.

In accordance with an embodiment of the invention shown in FIG. 1, is a system used to receive, sample and buffer multiple frequency-hopped signals contained within a number of different transmissions, with each frequency-hopped signal relating to a same transmission having a plurality of signal segments with each signal segment having RF energy within a different frequency band. Prior to extracting of signal segments from the multiple frequency-hopped signals, a wideband signal is first received by a receiver 101 as part of a signal acquisition system 100 that includes one or more controllable phase-locked tuners 102a through 102n to tune to within different frequency bands of the frequency-hopped signals, one or more synchronizer A/Ds 103a through 103n are used for digitizing analogue signals within the different frequency bands, with memory 104a through 104n used for buffering digital data representative of the sampled signals, and a real-time or quasi real-time frequency digital signal processing device. Optionally, a non-volatile storage medium can be included to record large amounts of data for post processing in applications with different requirements.

Figure 2:
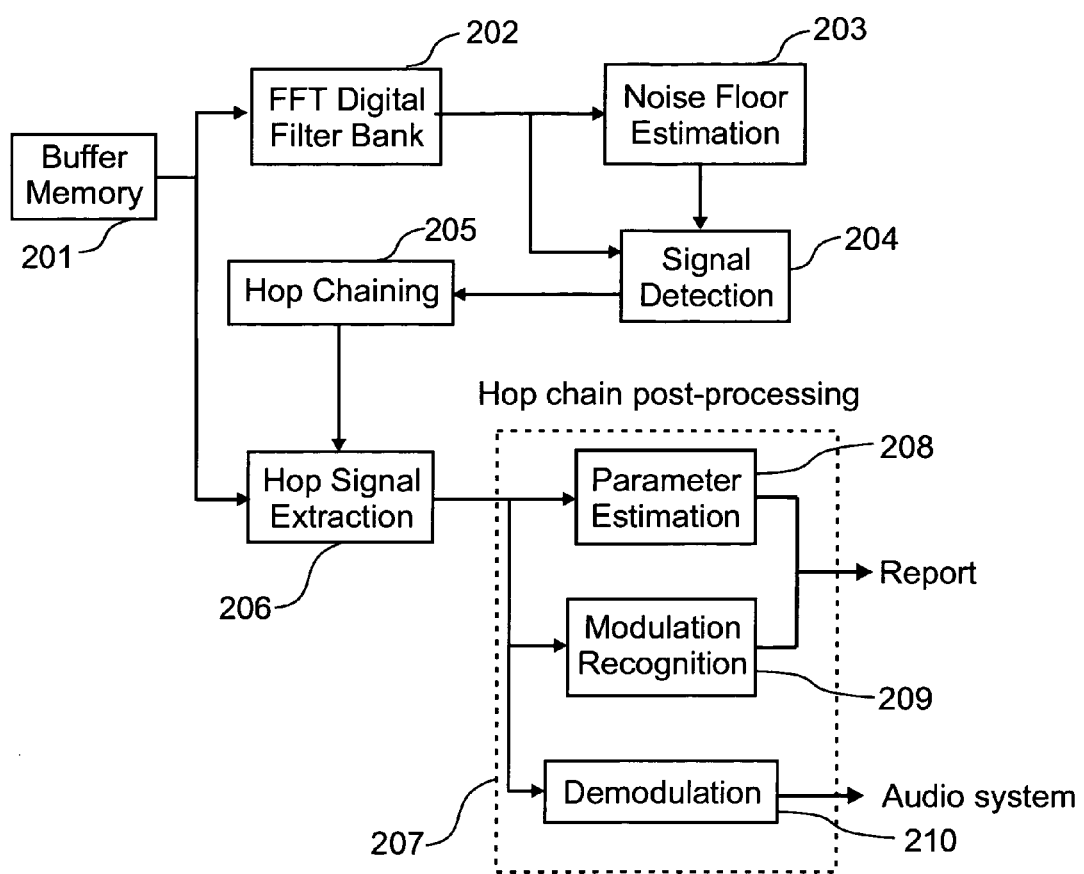
FIG. 2 is a schematic block diagram of a DFT filter bank with M frequency bins and N observations of the each frequency bin.
Figure 3A:
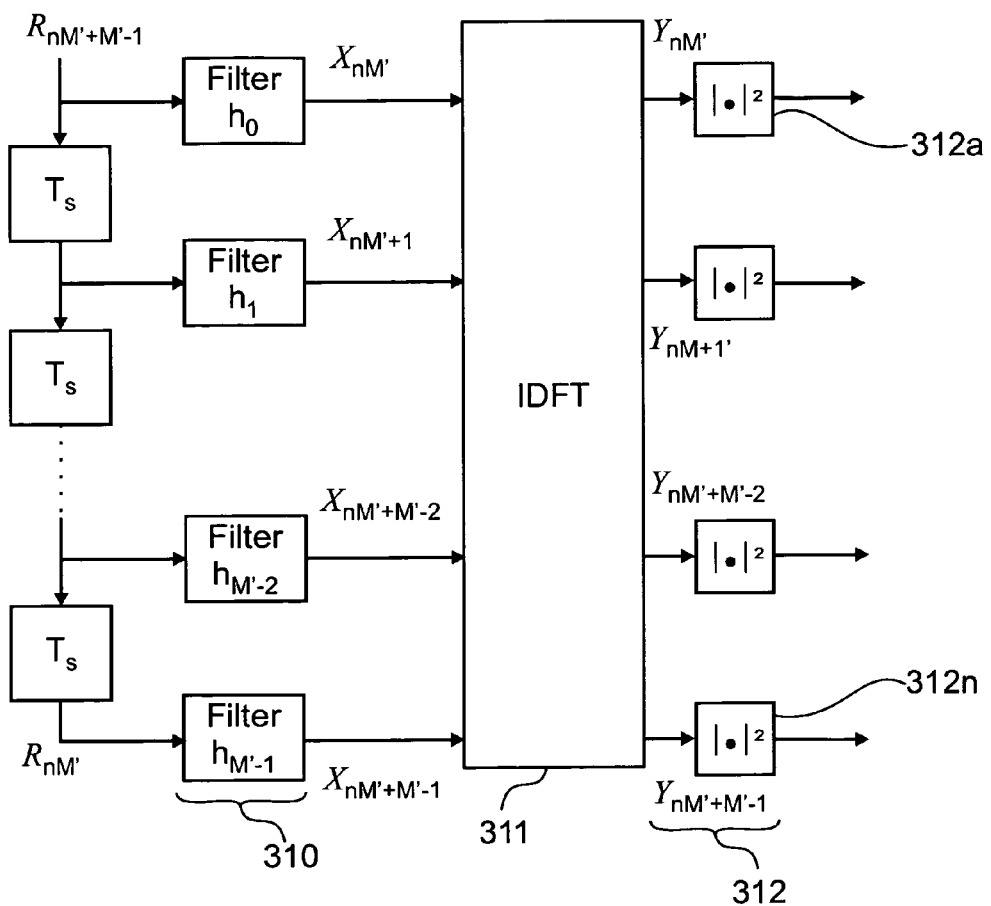
FIG. 3a illustrates a block diagram indicative of operations performed in order to extract data from signals found in the bins.
Figure 3B:
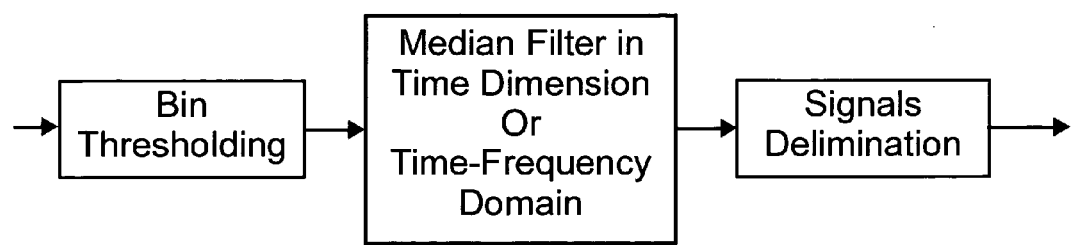

FIG. 2 illustrates a block diagram indicative of operations performed in order to extract hopping signals from the acquired wideband signal in a frequency band. A buffer memory 201 is used to store the received multiple frequency-hopped signal vectors $r_n$ from the receiver and digitizer pair(s), within each of a plurality of frequency bands, Filters 310 within the DFT filter bank, as shown in FIG. 3a, filter 202 the signals within each frequency band using an FFT algorithm to perform noise floor estimation 203 and hopping signal segment detection 204. Afterwards, a hop chaining process is performed 205 followed by hop signal extraction 206 to form a de-interleaved and extracted hop signal. A hop signal post processing block 207 receives this extracted hop signal. Within this block 207, signal parameter estimation is performed 208, as well as signal modulation recognition 209, and demodulating 210, on each of the signals located within the frequency band. FIG. 3b illustrates the steps of bin thresholding, median filtering in the time-frequency dimension and signal delimitation that are performed in the signal detection block 204, shown in FIG. 2.

TRANSFORMING THE ACQUIRED SIGNAL

A first filter bank applicable is the DFT filter bank shown in FIG. 3a. The DFT filter has M' frequency bands. A bin is typically a located region having a predetermined frequency band, with a number of bins being located within a broadband frequency range of the receiver. The four main functions of the DFT filter bank are windowing with a symmetric function 310. Discrete Fourier Transfrom (DFT) 311, a frequency bin complex sample magnitude squared 312, and a frequency swapping operation to have a frequency range from $-\alpha F_s/2$ to $\alpha F_s/2$ with $0<\alpha<1$ the efficiency factor of the digitizaton process, and $F_s$ the sampling frequency, thus $M=M'\alpha$.

The samples of the received signal and located within the frequency band are denoted by r, with i=0, 1, 2, . . . , . They are grouped in vectors of length M' to form a series of vectors $r_n$, n=0, 1, 2, . . . , N defined as $$r_n = \begin{bmatrix} r_{nM'+M'-1} \\ \vdots \\ r_{nM'+1} \\ r_{nM'} \end{bmatrix}. \quad (1)$$

The sampled received signals relating to frequencies located within the frequency band are therefore contiguous and non-overlapping. Received signal portions within the frequency band are element-by-element multiplied by the window samples $w_k$, with k=0, 1, . . . , M'-1, to create a vector $x_n$. The windowing operation is described by $$x_n=Wr_n, \quad (2)$$

where the square matrix W is a diagonal matrix with element $w_k$ in the k-th diagonal position. The window samples are assumed to be symmetric such that $w_k=w_{MK-1-k}$. Of course, for windows constrained to an odd number of taps, the symmetry is $w_k=w_{MK-2-k}$. Having a last tap set to zero, the vector $x_n$ is then linearly and efficiently transformed by an inverse DFT to produce another vector named $y_n$. This operation transforms the digital signal within a frequency band to provide a transformed signal within a frequency band that is either in the time-frequency domain or the time-scale using a known transform. The operation is formulated as:

$$y_n = Fx_n = FWr_n, \quad (3)$$

where F is a square matrix with the k-th row $f_k$ given by the k-th DFT basis, i.e., $$f_k = \exp[j2\pi ki/(M')]/\sqrt{M'}$$

with i, k=0, 1, . . . , M'-1. Of course, $FF^H=I$, where $(\bullet)^H$ denotes a Hermitien transpose and I is the identity matrix. The transformed signal within a frequency band, windowing, and the IDFT are efficiently used in implementing of a block filter bank. The vector $y_n$ is finally used to derive an estimate of the m-th bin output power by using a squaring operation 212a to 212n, on elements of $y_n$, for m=0, 1, . . . , M'-1, equation (4) results, where:

$$z_n^m = |y_n^m|^2, \quad (4)$$

$y_n^m$ the N elements of $y_n$ associated with the m-th bin at time n. The final operation is to perform the typical reordering operation to have frequency going from the negative values to the positive values.

The filter prototype is limited to be a linear phase filter. Therefore, only linear phase finite impulse response (FIR) filters are of concern in the present embodiment. Other filter bank structures are also possible, like the weighted overlap-add structure as is found in the two following publications: R. E. Crochiere, and L. R. Rabiner, Multirate Digital Signal Processing, Prentice-Hall, Signal Processing Series, pp. 313–326, 1983, and C. C. Gumas, "Window-presum FFT achieves high-dynamic range, resolution," Personal Engineering & Instrumentation News, pp. 58–65, July 1997, incorporated herein by reference. The polyphase DFT filter bank is also an implementation that is well suited. Details of the realization can be found in: R. E. Crochiere, and L. R. Rabiner, Multirate Digital Signal Processing. However, these latter structures do not add any general fundamental advantages to the filter bank presented herein, except for the addition of non-integer decimation for the cases where the sampling rate is not an integer multiple of the data rate for a channel within the signal within a frequency band. Each frequency band of course having a number of channels contained therein.

The aforementioned is applicable when the positions in frequency of the channels within a frequency band are known. In the context of spectrum monitoring, this is often not the case. Therefore, the position of a hop signal within a frequency band is preferably estimated in frequency.

Also, the bandwidth of the hop signal can be unknown. The parameters $F_s$, and M', are chosen such that several bins in the frequency or time scale domain are likely used by each hop signal.

Figure 4:
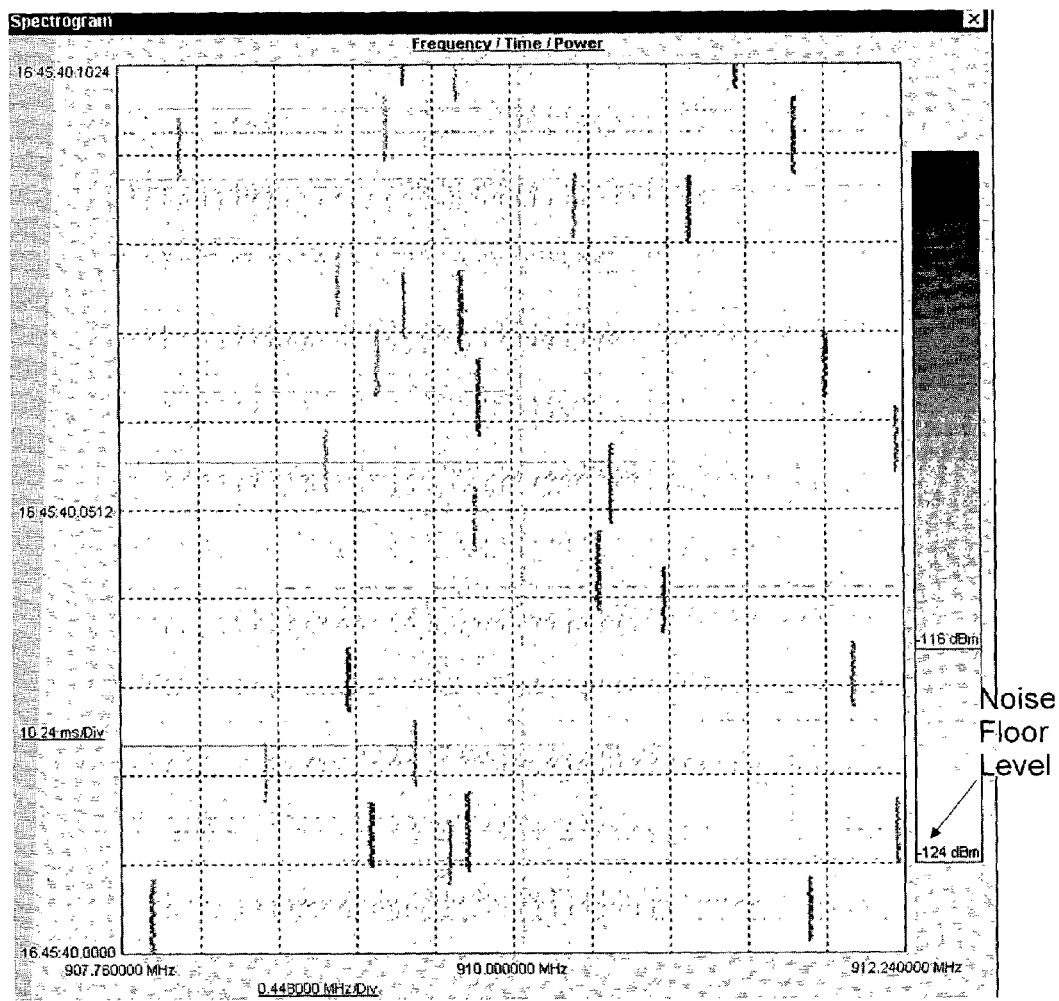
FIG. 4 is a computer generated spectrogram of a plurality of signal segments located within a plurality of frequency bands for multiple frequency hopped transmitters.

The raw output of the filter bank, prior to signals detection 204, over the observation period $NMT_s/\alpha$ is shown in a computer generated spectrogram shown in FIG. 4. FIG. 4 illustrates a computer spectrogram for a group of frequency hopped signals with 102.4 ms of data having a frequency resolution (frequency bin width) of ~5 kHz. A vertical axis of the spectrogram is in the time domain with 10.24 ms/division, with the division dependent upon a sampling frequency of the A/D converters. Along the horizontal axis frequency is shown, where in this case there are 0.448 MHz/division.

LOCATING SIGNALS WITHIN THE TRANSFORMED DOMAIN

From such a spectrogram, it is possible to estimate the noise floor level 203 within each frequency band using a technique disclosed in U.S. patent application Ser. No. 09/503,834, incorporated herein by reference. The noise floor estimator makes use of all frequency bands available or a subset of them. Once the noise floor level is estimated, assuming white Gaussian noise, a threshold is calculated within the signal detection block 204 that results in constant indication of a false alarm on a bin by bin basis. This process locates regions, within the time-frequency domain or time-scale domain, that are other than noise from within the transformed signal.

Figure 5:
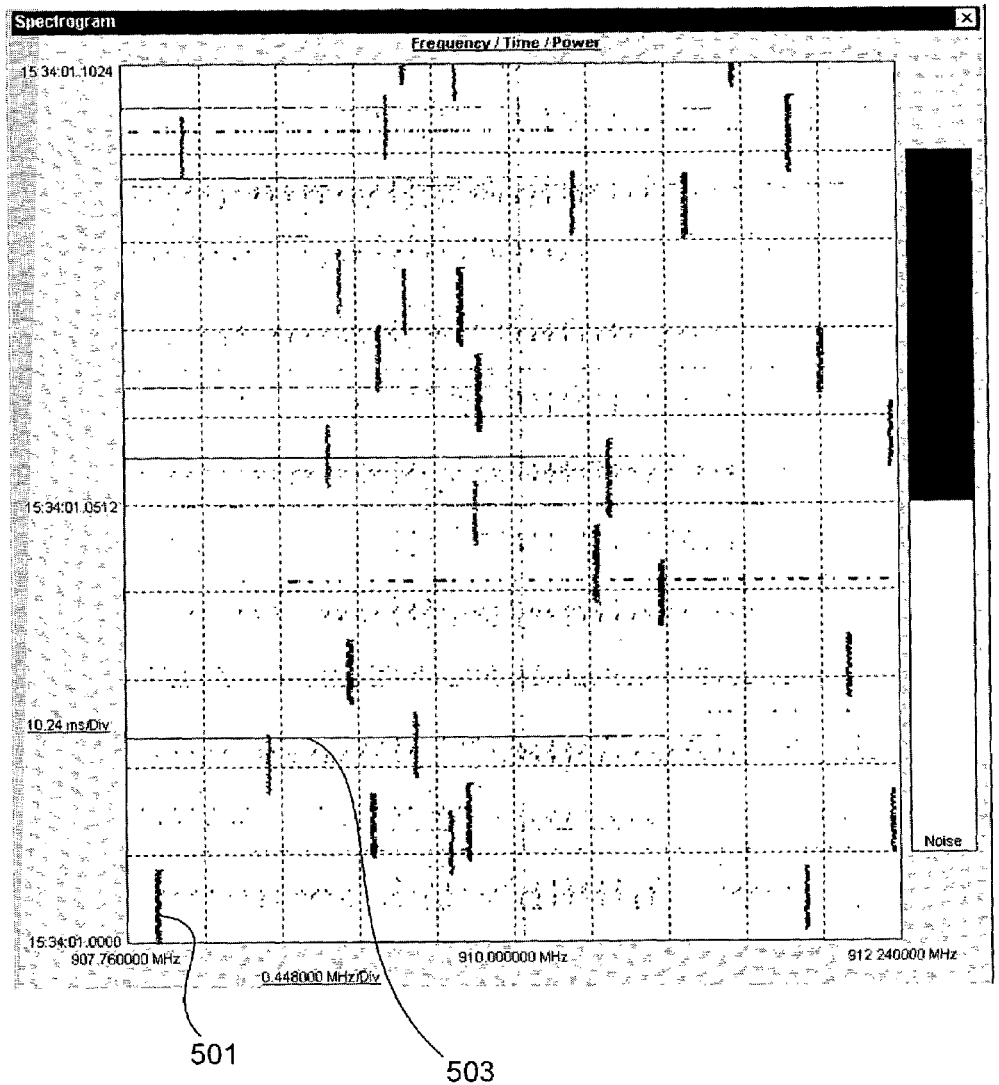
FIG. 5 is a computer generated spectrogram as shown in FIG. 4, having a constant probability of false alarm threshold of $10^{-3}$.

After applying a threshold at the level calculated, the computer generated spectrogram shown in FIG. 4 is now reduced to a two-level computer generated image in the time-frequency domain, as shown in FIG. 5. FIG. 5 presents the computer generated results of the thresholded spectrogram of FIG. 4. The figure clearly shows the presence of signal segments 501 within the bins, as well as the presence of impulsive noise 503 within some time segment. To eliminate this unwanted impulsive noise as well as reducing the number of bin false alarms, a one-dimensional median filter in the time domain at fixed frequencies) or a two-dimensional median filter is performed on the thresholded spectrogram within the step of signal detection 204. An example result is displayed in computer generated FIG. 6 for the detected signals within the frequency bands shown in FIG. 5. The filtering operation results in a figure where the signal segments located within the frequency band have been marginally affected while other unwanted signals, such as impulsive noise, have been largely eliminated from within each of the frequency bands. The result of the filtering operation is now fed to a signal segments delimitation stage that deliminates each signal segment in time and frequency. As a result, short duration signals such as signal segments, as well as continuous signals contained within the frequency band are now advantageously characterized.

The process of deliminating the signal segments from the transformed signal within a frequency band is described herein below and is performed within the signal detection processing block 204. Other than the data received itself from the receiver, two other parameters are used by the algorithm: the minimum bandwidth of the detected signal segment of interest and the minimum duration of the signal segment of interest. These two parameters are preferably used to reduce the number of false signal extractions as well as to provide estimation of the time and frequency resolution required in the FFT filter bank 202. The general idea of the signal extraction function is to find rectangular clusters in the time-frequency plane. Cluster analysis is known to those of skill in the art, an example of which is disclosed in J. C. Bezdek, S. K. Pal, Fuzzy Models for Pattern Recognition Methods That Search for Structures in Data, IEEE Press, New York, 1992, incorporated herein by reference.

Figure 6:
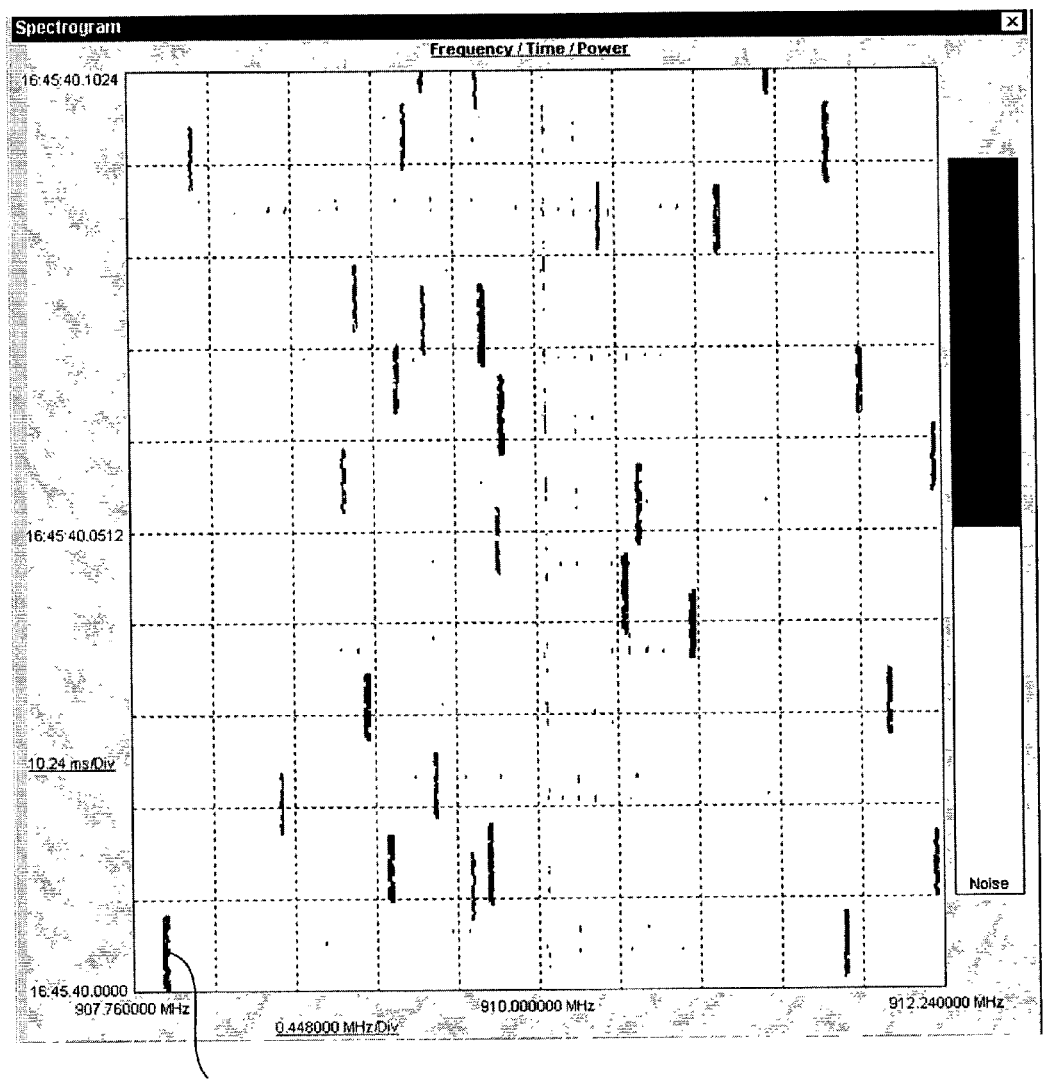
FIG. 6 is a computer generated spectrogram as shown in FIG. 4 after filtering of signals contained within the frequency bands; and, FIG. 7 is a signal table for the spectrogram of FIG. 4.

An exemplary signal segment delimitation process starts with an OR operation on consecutive binary frequency frames, within the frequency band, followed by a counter to track the time length of each group of 1's produced by the OR operation. Each group of 1's is identified by looking at transition in the frequency dimension (output of the OR process) from 0 to 1 for the group start and transition from 1 to 0 for the group end. Groups of 1's of course merge over time but cannot split. The width of the group of 1's is an indication of bandwidth for a signal segment. The duration of a group is estimated by a counter that records the length, in number, of frequency frames of the group. Several strategies can be included to deal with signal impairments during the delimitation of a signal. A group is terminated when the counter fails to increment for a new frequency frame and when no signal segment appears to be present in the near future. The terminated group is then compared to the minimum signal segment bandwidth and signal segment duration to ensure the validity of the signal segment. If one of the two criteria is not satisfied, the extracted signal segment is rejected and the memory associated with it, the group of 1's and the counter are reset to zero. If both criteria are satisfied, then the signal segment is extracted by recording the frame start and end, and the frequency start and end. This results in a rectangle in the time-frequency plane, as shown in FIG. 6, represented by the vertical lines, which represent each signal segment. The signal segment detection process is then completed by providing estimates of various parameters for each segment, where the parameters include at least a hop start time, hop duration, and segment power, but can also include bandwidth, signal to noise ratio, and carrier frequency. These parameters are stored in a signal segment table.

ANALYSIS OF DETECTED SIGNAL SEGMENTS

Once the table of signal segments has been generated by the time-frequency signal detection stage, the application associates appropriate signal segments to a same transmission. This is commonly known as hop de-interleaving. At this point, the hop de-interleaving is performed on a frequency-hopped signal acquisition basis with the time and frequency constraints associated with the acquisition system. This means that several hops, or signal segments, of a same transmission may unfortunately be missing in the current time-frequency plane. The signal segments at this point are not constrained to any channelization that is often used by frequency-hopping communication systems.

The parameters used to perform the operations of de-interleaving and analyzing of the transformed data within the frequency band are first signal parameters in the form of: hop duration, hop-timing, which is a start time of a hop, and occasionally a power level of the hop. A hop of course defined as being an individual signal segment. To those of skill in the art it is known that radio networks are typically asynchronous. Therefore, hops that overlap, are typically not from the same transmission, and hops that are from the same transmission typically form a non-overlapping sequence of signal transmissions. With the above constraint in mind, it is now feasible to test signal segments against each other and quickly come to a conclusion of which hops are associated together.

Details of one approach to do so are now presented. The ensemble of delimited signal segments from the signal detection 204 are then passed to the hop chaining process 205. The process starts with a grouping of the signal segments based on similar segment length and bandwidth if applicable. The grouping results in one or more groups each having a number of signal segments of similar length. The similarity may be measured by a running average of signal segment lengths having a small percentage of length difference. The second step of the process is the estimation of the repetition rate of the groups of similar length. This estimation for each group of signal segments of similar length involves measuring the start time difference between valid signal segments. A valid signal segment is one that does not overlap a reference segment and that is within a duty cycle of typical radios. The repetition rate can be calculated as the inverse of the maximum of the differences. Other way could be to average, to assign a fixed value, or otherwise. Finally, the groups that result in a repetition rate not being estimated are removed from the list of valid groups. This allows De-Interleaving of the Signal Segments as once the signal segments have been associated with a group and the repetition rate of a group has been estimated, the main step of the de-interleaving process is to assign the signal segments an identification number to form a chain or a transmission. Again, the logic consists of using signal segments of the same signal segment group length and check for non-overlapping assuming the repetition rate estimated in the second step.

For signal segments that have a timing that can not be resolved or that is too close according to the discrimination criteria, then the signal power difference is used as a discrimination feature. Other possibilities are weighted combination of timing and power difference, angle of arrival if available, or any combination of signal characteristics available. The choice of parameters to resolve ambiguity is application dependant and dictated by the uncertainty related to each sets of parameters. This terminates the hop chaining process and allows for the Hop Chain or Transmission Analysis and Demodulation. After the completion of the hop chaining process, the output is in the form of a list of chained signals, the actual chain of individual signal segments of interest are isolated by down converting the raw time samples to baseband and by decimating to the appropriate sampling rate in the step of hop signal extraction 206. This sampling rate is indicated by the bandwidth of the signal segment estimated by the width of the rectangle. The baseband decimated signal segments then feed to an automatic modulation recognition module 209. The automatic modulation recognition module 209, disclosed in U.S. patent application Ser. No. 09/504,676, incorporated herein by reference, is for modulation identification and for parameter estimation 208. Parameters that are estimated are for instance: carrier frequency, precise bandwidth, signal to noise ratio, and symbol rate if applicable.

The result of the time-frequency signal segment extraction is a table list with all the relevant parameter measurements as shown in FIG. 7, where the table is an example of such a list for the time-frequency spectrogram of FIG. 6.

In some instances, a given signal segment chain could be demodulated to determine signal content. The signal table list provides the necessary information to dedicate a particular demodulator block to the task.

The single channel networks or fixed frequency channels are easy to locate since they appear as vertical lines in the spectrogram and they go from the start to the end in the time dimension. The output of the hop chain post-processing stage is a signal report with some valuable parameters for spectrum monitoring analysis.

Advantageously, by using the aforementioned system, the at least one received radio transmission is at least partially reconstructed thus allowing for at least partial determination of information transmitted in the transmission by using hop duration, hop-timing, and occasionally a power level of the hop. The process could be repeated for subsequent or continuous data blocks to track over time the transmissions of interest. In these cases, signal information memory between blocks is typically added. This does not change the fundamentals of the invention, simply modifying the initial conditions of the hop chaining process.

Numerous other embodiments of the invention may be envisaged without departing from the spirit and scope of the invention.

What is claimed is:

1. A method of identifying a frequency hopping transmission signal without any prior knowledge specific to the frequency hopping transmission signal within a transmission signal comprising the steps of:
   receiving RF energy within a frequency band and providing a received signal in dependence thereon;
   digitizing the receive signal to form a digital signal;
   transforming the digital signal to provide transformed data within one of a time-frequency domain and a time-scale domain using a known transform;
   locating regions within the one of a time-frequency domain and a time-scale domain wherein the transformed data is indicative of energy other than noise being present;
   analyzing the transformed data within the located regions to determine first signal parameters thereof, the first signal parameters being other than a frequency-hopping sequence; and,
   de-interleaving the frequency-hopping signal in dependence upon the located regions and the determined first signal parameters thereof.

2. A method according to claim 1, comprising the step of:
   estimating second signal parameters of the de-interleaved frequency-hopping signal.

3. A method according to claim 2, comprising the step of:
   verifying the de-interleaved frequency-hopping signals in dependence upon the second signal parameters.

4. A method according to claim 1, wherein the step of receiving RF energy comprises the steps of:
   arranging one or more wide-band receivers having antennas, the one or more wideband receivers for receiving the RF energy within the frequency band, wherein the frequency band is a wide frequency band.

5. A method according to claim 1, wherein the step of locating comprises the steps of:
   measuring a level of the noise floor indicated by the transformed data;
   setting a threshold value for the detection of energy; and,
   applying the threshold to the transformed data,
   wherein the located regions are regions wherein a signal is present at a level above the threshold for the detection of the energy.

6. A method according to claim 1, wherein the transformed data is within the time-frequency domain.

7. A method according to claim 1, wherein the transformed data is within the time-scale domain.

8. A method according to claim 1, wherein the first signal parameters include an energy of a hop and at least one of hop duration and hop-timing.

9. A method according to claim 2, wherein the second signal parameters include an energy of a hop and at least one of hop duration, modulation scheme, angle of arrival and hop-timing.

10. A method according to claim 1, wherein the step of digitizing comprises the steps of:
    providing a memory circuit; and,
    storing the digital signal in the memory circuit.

11. A method according to claim 1, wherein the step of analyzing comprises the steps of:
    performing an operation on consecutive transformed data in a frequency domain;
    grouping the transformed data into predetermined groups;

identifying sub-groups of the groups by locating bit transitions in the frequency domain resulting from the grouping;

providing a counter associated with each group;

incrementing the counter during processing of a signal within the group;

terminating the incrementing of the counter when the counter fails to increment for a new frequency frame and when no signal segments appear to be present for subsequent received RF energy within a new frequency band; and, estimating the signal bandwidth and duration of the signal in the time-frequency domain.

12. A method according to claim 1, wherein the step of analyzing comprises the steps of:

performing an operation on consecutive binary frequency frames derived from the transformed data in a frequency domain;

initiating identification of a group containing at least a frequency frame by determining a first bit transition in the frequency domain;

providing a counter for incrementing thereof after the group has been identified;

incrementing the counter at each frequency frame, until a second bit transition is determined, the second bit transition being other than the first bit transition;

terminating the identification of the group containing at least a frequency frame when the second bit transition is determined, and, determining whether the group is a valid group by comparing the group to at least one of minimum signal segment bandwidth and signal segment duration.

13. A method according to claim 12, comprising the steps of:

rejecting the group if at least one of minimum signal bandwidth and signal duration is not satisfied in the step of determining, and resetting the counter to zero;

accepting the group if minimum signal segment bandwidth and signal segment duration are satisfied in the step of determining, and, performing the further steps of:

extracting a signal segment from the group;

recording values relating to frame start and frame end parameters for the extracted signal segment; and, recording values relating to frequency start and frequency end parameters for the extracted signal.

14. A method according to claim 11, wherein the operation is an OR operation.

15. A method according to claim 12, wherein the operation is an OR operation.

16. A method according to claim 11, wherein the first bit transition is a "1" to "0" transition.

17. A method according to claim 12, wherein the second bit transition is a "0" to "1" transition.

18. A method according to claim 1, wherein the step of de-interleaving comprises the steps of:

(a) providing a first located region, the first located region being established as the located region having a first start time;

(b) identifying the first located region as a first frequency hopping transmission signal within the transmission signal;

(c) providing an estimation of first signal parameters for the first frequency hopping transmission signal;

(d) providing a current located region, the current located region being the located region having a next start time being the first start time and an integer multiple of a located region duration;

(e) comparing at least one of the first signal parameters of the current located region with the corresponding first signal parameters of the first frequency hopping transmission signal;

(f) if a match is found within known tolerances, assigning the current located region to the matching first frequency hopping transmission signal;

(g) updating the first signal parameters of the matching first frequency hopping transmission signal by averaging the first signal parameters thereof with the first signal parameters of the current located region;

(h) if no match is found, identifying the current located region as one of a plurality of second frequency hopping transmission signals of the transmission signal;

(i) providing another current located region, the another current located region being the located region having a next start time being the first start time and an integer multiple of a located region duration;

(j) comparing at least one of the first signal parameters of the another current located region with the corresponding first signal parameters of at least the first frequency hopping transmission signal and plurality of second frequency hopping transmission signals;

(k) if a match is found within known tolerances, assigning the another current located region to the matching at least one of the first frequency hopping transmission signal and plurality of second frequency hopping transmission signals;

(l) updating the first signal parameters of the matching at least one of the first frequency hopping transmission signal and plurality of second frequency hopping transmission signals by averaging the first signal parameters thereof with the first signal parameters of the another current located region;

(m) if no match is found, identifying the another current located region as a further one of the plurality of second frequency hopping transmission signals of the transmission signal; and (n) iterating the steps (i) through (m) until a decision to stop is made.

19. A method according to claim 18, wherein the first signal parameters parameters include at least one of hop duration, hop rate and hop start time.

20. A method according to claim 1, wherein the step of receiving comprises the steps of:

receiving a second RF energy within the frequency band and providing a second received signal in dependence thereon;

estimating an angle of arrival of a located region using the received signal and the second received signal;

addressing ambiguity when the first signal parameters of the located region are insufficient for performing de-interleaving by comparing the angle of arrival of the located region to an average angle of arrival of the resulting de-interleaved signal.

21. A method according to claim 20, including the step of using at least one of an angle distance measure and a statistical confidence measure to select between simultaneous located regions for incorporation into a same de-interleaved signal.

22. A method according to claim 1, wherein the steps are performed for de-interleaving multiple simultaneous frequency hopping transmission signals using the first signal parameters, wherein the first signal parameters comprise at least one of hop duration, and hop timing, and hop rate.

23. A method according to claim 22, wherein the first signal parameters include all of hop duration, and hop timing, and hop rate.

* * * * *